UNITED STATES PATENT OFFICE.

WM. S. LYON, OF TRANQUILITY, OHIO.

IMPROVED MEDICAL COMPOUND.

Specification forming part of Letters Patent No. 68,632, dated September 10, 1867.

*To all whom it may concern:*

Be it known that I, WM. S. LYON, of Tranquility, in the county of Adams, in the State of Ohio, have invented a new Compound; and I do hereby declare that the following is a full and exact description thereof.

The nature of my invention consists in its applicability to all wounds, in arresting and forever warding off all fungus flesh or gangrene, and a speedy cure for white swelling, bone-felon, and catarrh. It has no equal in prolapsus ani, rheumatism, &c.

To enable others skilled in the art to make and use my invention, I will proceed to describe my manner of compounding.

I use equal quantities of gum-ammoniac, English rosin, beeswax, one-fourth quantity gum-myrrh, equal quantities Venice turpentine and hog's lard. Put the gum-ammoniac, English rosin, beeswax, and gum-myrrh in any quantity of water, boil for thirty minutes, then stir it well, and set off to cool. When cold, lift off all the top, clean the pot or kettle, put back the mass obtained into the pot or kettle, add thereto the turpentine and hog's lard, boil fifteen minutes, stir well, and pour it into a quantity of clean cold water. When cool, work all the water out and box for use.

What I claim as my invention, and desire to secure by Letters Patent, is—

The combination of the above-mentioned ingredients substantially as described.

WM. S. LYON.

Witnesses:
JOHN MCCREIGHT,
W. A. BLAIR.